United States Patent Office 3,203,750
Patented Aug. 31, 1965

3,203,750
PROCESS FOR DYEING SHAPED ARTICLES OF POLYMERS OF OLEFINIC UNSATURATED COMPOUNDS
Jose Carbonell, Basel, Ernest Merian, Bottmingen, and Reinhard Neier, Basel, Switzerland, assignors to Sandoz Ltd., Basel, Switzerland
No Drawing. Filed Aug. 3, 1962, Ser. No. 214,526
Claims priority, application Switzerland, Aug. 18, 1961, 9,676/61
8 Claims. (Cl. 8—4)

It is very difficult to dye fibers of polyalkylenes, e.g., proplypropylene or polyisobutylene, in deep reddish violet to blue shades fast to light, dry cleaning, rubbing and wet treatments (water, washing, perspiration).

It has now been found that dyes of the formula

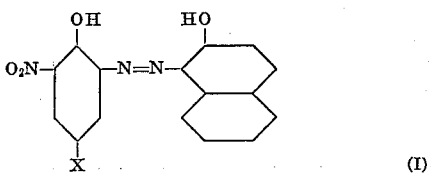

are suitable for dyeing shaped articles of polymers of olefinic unsaturated compounds in deep shades with good to excellent fastness properties. In this formula, X represents an alkyl radical having preferably 1 to 5 carbon atoms, or chlorine or bromine. The use of the dye of Formula I in which X is chlorine is preferred. It can be produced by the normal process, e.g., by coupling diazotized 2 - amino - 1-hydroxy-4-chloro-6-nitrobenzene with 2-hydroxynaphthalene in alkaline solution in accordance with the process of German Patent 3,224.

If the polymer to be dyed already contains the metal necessary for complex formation with the dye (I), e.g., when for the polymerization of the parent monomeric compounds, metal compounds which are capable of complex formation with dyes are used as stabilizers against heat and light, e.g., nickel chromium, cobalt or aluminium compounds such as aluminium alkyls, or when additional metal compounds capable of complex-formation are built into the polymer, the obtained dyeings are particularly fast to light, dry cleaning, rubbing, water, sea-water, washing and perspiration.

The polymers to be dyed may be produced by any of the known polymerization processes since the process is of no significance for dyeing with the dye (I). For instance, polypropylene and polyisobutylene produced by either the high-pressure or low-pressure processes can be dyed equally well, although they differ in specific gravity and other physical properties. The dye of Formula I is suitable for dyeing all these polymerization products, which hitherto could only be dyed with great difficulty and would yield dyeings with very poor fastness properties.

In this context the term, "shaped articles," refers to textile materials, i.e., filaments, fibers, yarns, slubbing and tops, nonwoven and woven fabrics, and knitted goods, and also to films, foil, tubing and objects of any other shape for everyday use. Naturally, the shape of the material or object to be dyed is of no significance for the disclosed process.

Dyeing, under which is understood all methods of impregnation with dyeing preparations, e.g., padding and printing as well as dyeing proper, is carried out by the known methods. The amount of dye applied may vary from about 0.01 to 5 grams per 100 grams of the polymer. The pH region of approximately 1 to 7 is favorable. The dyeing is carried out at higher temperature, advantageously between about 90° and 140° C., depending on the heat stability of the fiber. The liquor ratio can vary within wide limits, e.g., between approximately 1:3 and 1:100, or preferably between 1:3 and 1:40. At liquor ratios above 1:100 it is even more advisable than at smaller liquor ratios to dye in the presence of one of the commonly used neutral salts, e.g., up to about 30% sodium chloride or calcined sodium sulfate calculated on the weight of the fiber. The addition of mineral acids, e.g., sulfuric acid, or stronger organic acids, e.g., formic or acetic acid, often results in brighter dyeing of greater depth. These acids can be employed in amounts of about 1 to 4% calculated on the weight of the fiber. An addition of ammonium sulfate, which is widely used in dyeing, e.g., 1-2 grams per liter of the dyeing medium, can also be of advantage.

Other generally used dyeing assistants which can be of use for the present purpose are the dispersing agents e.g. of anionic or nonionic character. Mixtures of dispersing agents are often beneficial. A small amount of dispersing agent, e.g. 0.2 gram per liter dyeliquor, is often sufficient, but amounts of 0.5 to 3 grams per liter are preferable. It is of little advantage to increase the amount to more than 5 grams per liter.

Examples of suitable dispersing agents are the known anionic types, e.g., the condensation products of naphthalenesulfonic acids and formaldehyde, particularly sodium dinapthylmethane-disulfonate, the esters of sulfosuccinic acid, Turkey red oil, sodium cetyl sulfate, lauryl alcohol sulfate and other alkali metal salts of the sulfuric acid esters of fatty alcohols, the alkali metal salts of sulfite cellulose liquor, soaps, the akali metal sulfates of monoglycerides of fatty acids, and also nonionic dispersing agents, e.g., the additional products of about 3 to 40 moles of ethylene oxide and alkylphenols or fatty alcohols, and their sulfuric acid esters.

The dyeings obtained have very good fastness properties, particularly good wet fastness and good fastness to light, rubbing and dry cleaning.

The parts and percentages in the following methods and examples are by weight and the temperatures in degrees centigrade.

Method for the production of a dye of Formula I.—
18.9 parts of 2-amino-1-hydroxy-4-chloro-6-nitrobenzene are dissolved with 7 parts of sodium hydroxide in 200 parts of water at 90°. 6.9 parts of sodium nitrite are added and the solution run with good cooling into 30 parts of 30% hydrochloric acid. The yellow-brown suspension of the diazo compound is mixed with a solution of 14.4 parts of 2-hydroxynaphthalene and 10 parts sodium hydroxide in 100 parts of water. So soon as formation of the monoazo dye is completed it is precipitated by the addition of sodium chloride and filtered. On drying and grinding it is obtained as a dark powder which dissolves in warm aqueous sodium hydroxide solution with a violet-gray coloration and in concentrated sulfuric acid with a red-violet coloration.

EXAMPLE 1

3.5 parts of the dye of Formula I in which X represents chlorine are ground for 48 hours in a ball mill with 3 parts of the disodium salt of a dinaphthylmethanedisulfonic acid and 3.5 parts of sodium sulfate.

1 part of the resulting dyeing preparation is pasted with 1 part of water and the paste slowly diluted with 3998 parts of water. 100 parts of a fiber of polypropylene containing 0.07% of nickel are entered into this dyebath. The temperature is raised to the boil in 30–40 minutes and dyeing continued at this temperature for 2 hours. The fiber is rinsed in cold water, soaped for 15 minutes at 70° in a solution containing 1 gram per liter of a fatty alcohol sulfate, then rinsed again in cold water and dried. It is dyed a deep violet fast to light, dry cleaning, rubbing, water, washing and perspiration.

EXAMPLE 2

1.5 parts of the dyeing preparation described in Example 1 are pasted with 1.5 parts of cold water and the paste slowly diluted with 997 parts of water at 50–60° containing 1 gram per liter of the sodium salt of a sulfonated fatty acid, added with constant stirring. 5 parts of sodium sulfate and 1 part of glacial acetic acid are added to this dyebath at 20°. It is then heated to 60° and at this temperature 50 parts of a fabric of polypropylene fiber containing approximately 0.1% chromium are entered. The dyebath is brought to the boil in 40–50 minutes and dyeing continued at this temperature for 1½ hours. The fabric is rinsed in cold water and dried. The deep reddish blue dyeing is fast to light, dry cleaning, rubbing, water, washing and perspiration.

The following Table 1 contains the details of further dyeing examples which were carried out with the dyeing preparation of Example 1 and are characterized by the particulars given in the 11 columns of the table.

The following Table 2 contains the details of further dyeing examples carried out with a dyeing preparation containing 35% of dye, 35% of anhydrous sodium sulfate and 30% of sodium dinaphthylmethanedisulfonate ground together for 48 hours in a ball mill. The dyeing process was that of Example 1 or of Example 2 (column (I)), using 100 parts of polymer (column (II)) and a variable amount of dyeing preparation with 35% of dye (column (III)), the dye having the formula

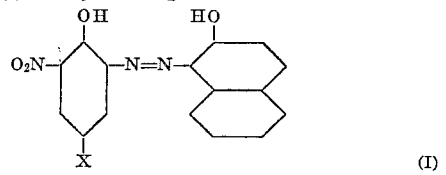

and being characterized by X (column (IV)). The shade of the dyeings are indicated in column (V).

The dyeings obtained in the Examples 3 to 19 possess good fastness to light, dry cleaning, rubbing and wet treatments such as water, sea-water, washing and perspiration.

EXAMPLE 20

A printing paste of the following composition is prepared:

A
50 parts of sodium alginate
450 parts of water

B
30 parts of the dyeing preparation described in Example 1
2 parts of the addition compound of ethylene oxide and oleyl alcohol (as dispersing agent)
168 parts of water

C
50 parts of sodium sulfate
10 parts of formic acid
2 parts of ammonium sulfate
238 parts of water ────────
1000 parts Mixture A is prepared by stirring the sodium alginate into the water, boiling for a short time and then allowing to cool.

The dyeing preparation is pasted with the dispersing agent, 30 parts of cold water are added to the paste and subsequently 138 parts of water at 50° to give Mixture B.

The components of Mixture C are heated until everything is dissolved, and the solution allowed to cool.

Mixtures A and C are mixed together and then mixed with B.

This paste is printed on a polypropylene fabric containing 0.07% nickel or 0.10% cobalt. The print is

*Table 1*

| Ex. | Parts of dyeing preparation of Ex. 1 used | Parts water for pasting | Parts water for diluting | Temp. of dyebath, deg. | Addition to dyebath | Temp. of dyebath, deg. | Fiber | Heating time, min. | Temp. for dyeing, deg. | Dyeing time, min. | Shade of dyeing |
|---|---|---|---|---|---|---|---|---|---|---|---|
| 3 | 0.5 | 0.5 | 799 (with 2 g./l. of the sodium salt of a sulfonated fatty alcohol). | 30 | 3 parts sodium chloride, 0.8 part sulfuric acid. | 50 | 10 parts polypropylene with 0.05% aluminium and 0.02% calcium. | 60 | 110 | 45 | Dark blue. |
| 4 | 1 | 2 | 397 (with 0.5 g./l. of an ethylene oxide derivative of a fatty alcohol). | 25 | 4 parts sodium sulfate, 0.4 part formic acid, 0.8 part ammonium sulfate. | 55 | 40 parts polyisobutylene with 0.08% chromium. | 75 | 140 | 60 | Blue violet. |
| 5 | 3 | 4 | 3,993 | 20 | 15 parts sodium chloride, 4 parts ammonium sulfate, 4 parts glacial acetic acid. | 60 | 100 parts polypropylene with 0.04% chromium. | 70 | 130 | 45 | Reddish blue. |

*Table 2*

| Example No. | Dyeing process of example (I) | Polymer used (II) | Parts of dyeing preparation (III) | X (IV) | Shade of dyeing (V) |
|---|---|---|---|---|---|
| 6 | 1 | Polypropylene with 0.08% chromium | 1 | Bromine | Reddish blue. |
| 7 | 2 | ...do... | 1.2 | Methyl | Violet. |
| 8 | 2 | Polypropylene with 0.10% cobalt | 0.8 | Chlorine | Do. |
| 9 | 2 | Polyisobutylene with 0.07% nickel | 1 | ...do... | Do. |
| 10 | 1 | ...do... | 1.5 | Isopropyl | Do. |
| 11 | 1 | Polyisobutylene with 0.12% cobalt | 0.5 | Chlorine | Light violet. |
| 12 | 1 | ...do... | 1.5 | ...do... | Violet. |
| 13 | 1 | Polypropylene with 0.2% nickel | 1 | n-Butyl | Do. |
| 14 | 1 | ...do... | 1 | Ethyl | Do. |
| 15 | 2 | Polyisobutylene with 0.15% aluminium. | 1.5 | Chlorine | Dark blue. |
| 16 | 2 | ...do... | 1.5 | Tert. butyl | Do. |
| 17 | 1 | Polypropylene with 0.1% chromium | 2 | Tert. amyl | Violet. |
| 18 | 1 | ...do... | 1.4 | n-Propyl | Do. |
| 19 | 2 | Polypropylene with 0.2% nickel | 3 | Chlorine | Do. | dried, steamed for 30 minutes at 1.5 atmospheres with saturated steam, rinsed at 20–60°, soaped with 1 gram per liter of a fatty alcohol sulfate, rinsed in cold water and dried. The fabric is dyed dark violet and has excellent wet fastness properties and is also fast to light, rubbing and dry cleaning.

EXAMPLE 21

40 parts of the dyeing preparation according to Example 1 are pasted with 40 parts of water, and the paste diluted with 420 parts of water containing 10 grams per liter of an addition compound of ethylene oxide and stearyl alcohol. The resulting dye dispersion is run slowly, with stirring, into a solution of 4 parts of sodium alginate and 496 parts of water. With this liquor a fabric of polypropylene containing 0.2% chromium is padded, and is then squeezed to contain 80% of its weight of moisture, dried, steamed for 10 minutes at 125° with saturated steam, rinsed, soaped, rinsed again and dried. The violet dyeing thus obtained is fast to light, dry cleaning, rubbing, water, washing and perspiration. Gum tragacanth or crystal gum can be used in place of sodium aliginate.

By using the polymers listed in Table 1 or Table 2 and treating them with the dyeing preparations characterized in columns (III) and (IV) of Table 2, violet to blue dyeings with excellent wet fastness properties and good to very good fastness to light, rubbing and dry cleaning are obtained.

Having thus disclosed the invention what we claim is:

1. A process for dyeing shaped articles of polymers of olefinic unsaturated compounds, the said process consisting in treating the polymer to be dyed at a temperature of from 90° to 140° C. with an aqueous dystuff preparation containing as essential component a dye of the formula

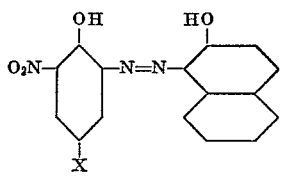

wherein X represents a member selected from the group consisting of alkyl with 1 to 5 carbon atoms, chlorine and bromine.

2. A process for dyeing shaped articles of polymers which the selected from the group consisting of polypropylene and polyisobutylene, said polymers containing metal complex compounds for stabilization against heat and light, said metal complex compounds being selected from the group consisting of aluminum, chromium, nickel and cobalt, the said process consisting in treating the polymer to be dyed at a temperature of from 90° to 140° C. with an aqueous dyestuff preparation containing as essential component a dye of the formula

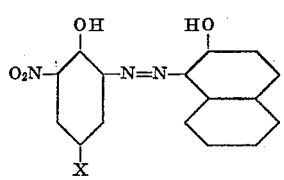

wherein X represents a member selected from the group consisting of alkyl with 1 to 5 carbon atoms, chlorine and bromine.

3. A process for dyeing shaped articles of polypropylene containing nickel, which consists in treating the polymer at a temperature of from 90° to 140° C. with an aqueous dyestuff preparation containing as essential component the dye of the formula

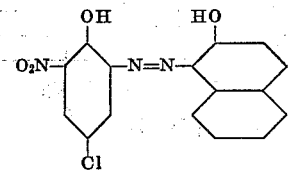

4. A process for dyeing shaped articles of polypropylene containing chromium, which consists in treating the polymer at a temperature of from 90° to 140° C. with an aqueous dyestuff preparation containing as essential component the dye of the formula

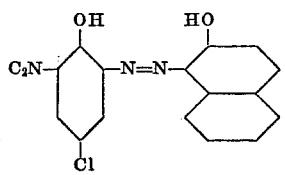

5. A process for dyeing shaped articles of polypropylene containing cobalt, which consists in treating the polymer at a temperature of from 90° to 140° C. with an aqueous dyestuff preparation containing as essential component the dye of the formula

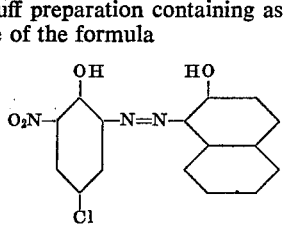

6. A process for dyeing shaped articles of polyisobutylene containing nickel, which consists in treating the polymer at a temperature of from 90° to 140° C. with an aqueous dyestuff preparation containing as essential component the dye of the formula

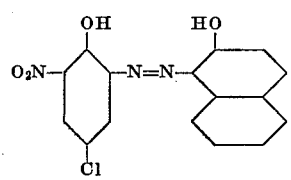

7. A process for dyeing shaped articles of polyisobutylene containing chromium, which consists in treating the polymer at a temperature of from 90° to 140° C. with an aqueous dyestuff preparation containing as essential component the dye of the formula

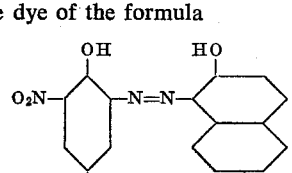

8. A process for dyeing shaped articles of polyisobutylene containing cobalt, which consists in treating the polymer at a temperature of from 90° to 140° C. with an aqueous dyestuff preparation containing as essential component the dye of the formula

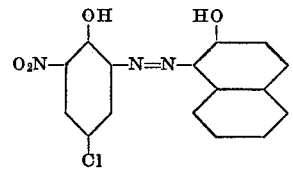

(References on following page)

References Cited by the Examiner

UNITED STATES PATENTS

| | | | |
|---|---|---|---|
| 2,215,196 | 9/40 | Schlack | 8—55 |
| 3,023,072 | 2/62 | Dabrowski | 8—55 |
| 3,097,044 | 7/63 | Skeuse | 8—55 |

FOREIGN PATENTS

| | | |
|---|---|---|
| 3,224 | 3/78 | Germany. |
| 810,023 | 3/59 | Great Britain. |
| 842,872 | 7/60 | Great Britain. |
| 849,181 | 9/60 | Great Britain. |
| 851,611 | 10/60 | Great Britain. |

NORMAN G. TORCHIN, *Primary Examiner.*

ABRAHAM H. WINKELSTEIN, *Examiner.*